(12) United States Patent
Noh et al.

(10) Patent No.: US 12,570,896 B2
(45) Date of Patent: Mar. 10, 2026

(54) QUANTUM DOT-POLYMER COMPOSITE PARTICLES AND METHOD FOR PREPARING SAME

(71) Applicant: HANSOL CHEMICAL CO.,LTD., Seoul (KR)

(72) Inventors: Jaehong Noh, Jeonju-si (KR); Gyucheol Yoon, Jeonju-si (KR); Kyeonghun Gil, Chungcheongnam-do (KR); Kyungnam Kim, Seo-gu (KR); Sungmin Ha, Jeonju-si (KR); Chunrae Nam, Jeonju-si (KR)

(73) Assignee: HANSOL CHEMICAL CO., LTD, Seoul (KR)

( * ) Notice: Subject to any disclaimer, the term of this patent is extended or adjusted under 35 U.S.C. 154(b) by 545 days.

(21) Appl. No.: 17/761,130

(22) PCT Filed: Sep. 3, 2020

(86) PCT No.: PCT/KR2020/011803
§ 371 (c)(1),
(2) Date: Mar. 16, 2022

(87) PCT Pub. No.: WO2021/054654
PCT Pub. Date: Mar. 25, 2021

(65) Prior Publication Data
US 2022/0372367 A1 Nov. 24, 2022

(30) Foreign Application Priority Data
Sep. 18, 2019 (KR) ........................ 10-2019-0114522

(51) Int. Cl.
C09K 11/02 (2006.01)
B82Y 30/00 (2011.01)
(Continued)

(52) U.S. Cl.
CPC ............ *C09K 11/025* (2013.01); *B82Y 30/00* (2013.01); *B82Y 40/00* (2013.01); *C08K 3/013* (2018.01)

(58) Field of Classification Search
CPC ....... C09K 11/025; B82Y 30/00; B82Y 40/00; C08K 3/013
See application file for complete search history.

(56) References Cited

U.S. PATENT DOCUMENTS

| | | | |
|---|---|---|---|
| 8,957,401 B2 * | 2/2015 | Pickett | H10H 20/8514 |
| | | | 257/E31.051 |
| 2017/0174984 A1 * | 6/2017 | Lee | C09K 11/025 |
| 2018/0215997 A1 * | 8/2018 | Zhao | C09K 11/883 |

FOREIGN PATENT DOCUMENTS

| | | |
|---|---|---|
| JP | 2013-505347 A | 2/2013 |
| KR | 2015-0027701 A | 3/2015 |

(Continued)

OTHER PUBLICATIONS

International Patent Application No. PCT/KR2020/011803; Int'l Written Opinion and Search Report; dated Jan. 21, 2021; 7 pages.

*Primary Examiner* — Jay C Kim
*Assistant Examiner* — Woo K Lee
(74) *Attorney, Agent, or Firm* — Sughrue Mion, PLLC

(57) ABSTRACT

The present invention relates to quantum dot-polymer composite particles and a method for preparing same, the composite particles comprising: quantum dots; and a (meth) acrylic polymer coating layer formed to surround the surface of the quantum dots, and to a technology for expanding the application of quantum dots which can ensure high stability and excellent luminous efficiency by including the polymer coating layer.

4 Claims, 2 Drawing Sheets

(51) Int. Cl.
    *B82Y 40/00*        (2011.01)
    *C08K 3/013*       (2018.01)

(56)               References Cited

FOREIGN PATENT DOCUMENTS

| | | | |
|---|---|---|---|
| KR | 2018-0059724 | A | 6/2018 |
| KR | 2018-0081002 | A | 7/2018 |
| KR | 2019-0102025 | A | 9/2019 |

* cited by examiner

QUANTUM DOT-POLYMER COMPOSITE PARTICLES AND METHOD FOR PREPARING SAME

TECHNICAL FIELD

The present disclosure relates to quantum dot-polymer composite particles and a manufacturing method therefor, the composite particles including a quantum dot and a (meth)acrylic polymer coating layer formed to enclose the surface of the quantum dot, and to technology to extend the application of quantum dots, which can secure high stability and excellent luminous efficiency by containing the polymer coating layer.

BACKGROUND ART

Quantum dots (QDs) can emit different wavelengths of light according to particle sizes without changing the kind of material, thereby displaying various colors, and are receiving attention as a next-generation light emitting element due to higher color purity and light efficiency thereof compared with existing light emitters.

Displays using quantum dots, currently on the market, have a form in which a film containing quantum dots (QDs) is formed and then embedded in TV. Such an application of quantum dots in a film form causes a drawback in that the amount of quantum dots used is large.

On the other hand, when the form of packaging (LED PKG) is converted by using a film form of quantum dots as an encapsulant for a light emitting element, the amount of quantum dots used can be significantly reduced, and a display, for example, a TV, can be reduced in thickness and thus is thinned. However, there are many problems in the direct application of quantum dots to the LED PKG.

Especially, quantum dots are vulnerable to oxygen and moisture, and thus undergo oxidative damage when exposed for a long period of time, resulting in a decrease in luminance. Moreover, quantum dots act as a factor that hinders the curing of a heat-curable silicone resin, which is a main ingredient of a packaging resin composition, thereby degrading the reliability and stability of packaging as well as causing a reduction in luminous efficiency and a change in luminous wavelength of LEDs due to self-heating.

DISCLOSURE OF INVENTION

Technical Problem

The present disclosure has been made to solve the above-mentioned problems, and an aspect of the present disclosure is to achieve a continuous exertion of high stability and excellent luminous efficiency through the coating of quantum dots as well as provide a novel packaging application technique using the same.

Solution to Problem

In an accordance with an aspect of the present disclosure, there are provided quantum dot-polymer composite particles, including: a quantum dot (QD); and a (meth)acrylic polymer coating layer formed to enclose the quantum dot.

According to an embodiment of the present disclosure, the (meth)acrylic polymer coating layer may contain a polymer of (meth)acrylic monomers or a (meth)acrylic resin, in which the content of at least one polar functional group selected from a carboxyl group and a hydroxy group is 1-50 wt % in a molecule.

According to an embodiment of the present disclosure, the (meth)acrylic polymer coating layer may have a molecular weight (Mw) of 5,000 to 500,000 g/mol.

According to an embodiment of the present disclosure, the (meth)acrylic polymer coating layer may have a thickness of 1 nm to 20 μm.

According to an embodiment of the present disclosure, the quantum dot may include a quantum dot nanoparticle, a quantum dot-containing particle, or a primary particle of a plurality of quantum dot particles aggregated.

According to an embodiment of the present disclosure, the quantum dot may have a core-shell structure including at least one shell layer.

According to an embodiment of the present disclosure, the at least one shell layer may contain at least one selected from the group consisting of ZnS, ZnSeS, ZnTeS, ZnSeTeS, CdZnS, CdZnSeS, CdZnTeS, HgZnS, HgZnSeS, and HgZnTeS.

According to an embodiment of the present disclosure, the primary particle may further contain thermally conductive inorganic particles.

According to an embodiment of the present disclosure, the thermally conductive inorganic particles may be at least one selected from the group consisting of aluminum oxide, silicon oxide, titanium dioxide, aluminum nitride, boron nitride, silicon nitride, silicon carbide, and aluminum hydroxide.

According to an embodiment of the present disclosure, the content of the thermally conductive inorganic particles may be 0.1 to 99.9 parts by weight relative to the total weight of the primary particle.

According to an embodiment of the present disclosure, the quantum dot may include a surface treatment layer containing at least one of a halide and an oxyhalide.

According to an embodiment of the present disclosure, the surface treatment layer may contain an organic halide, an inorganic halide, an inorganic oxyhalide, or a mixture thereof.

In accordance with another aspect of the present disclosure, there is provided a method for manufacturing quantum dot-polymer composite particles, the method including: (i) preparing a polymer-containing solution in which a polymer is dissolved; (ii) adding and mixing quantum dots with the polymer-containing solution and then curing the mixture by addition of a polymer curing inducer; and (iii) separating a cured product from the polymer-containing solution and then drying the cured product.

According to an embodiment of the present disclosure, the polymer curing inducer in step (ii) may include at least one of a Zn-based compound and an Al-based compound.

According to an embodiment of the present disclosure, in step (ii), the amount of the polymer curing inducer used may be 2 to 30 parts by weight relative to the total weight of the polymer-containing solution.

According to an embodiment of the present disclosure, the quantum dots in step (ii) may have a surface treatment layer containing at least one of a halide and an oxyhalide.

According to an embodiment of the present disclosure, in step (a), 100 to 1,000,000 parts by weight of thermally conductive inorganic particles relative to 100 parts by weight of the quantum dots may be added and mixed.

According to an embodiment of the present disclosure, the manufacturing method further include (iv) pulverizing the dried product in step (iii) to an average particle diameter (d50) of 100 μm or less.

Advantageous Effects of Invention

According to an embodiment of the present disclosure, high stability and excellent luminous efficiency can be continuously exerted without deterioration of properties by coating of the surface of quantum dots with a (meth)acrylic polymer.

Furthermore, according to the present disclosure, a conventional problem of non-curing of a silicone resin due to quantum dots can be solved, so that quantum dots can be directly applied to LED packaging (PKG) and extensively applied to various technical fields.

The advantageous effects according to the present disclosure are not limited by the contents exemplified above, and more various advantageous effects are included herein.

BEST MODE FOR CARRYING OUT THE INVENTION

Figure 1:
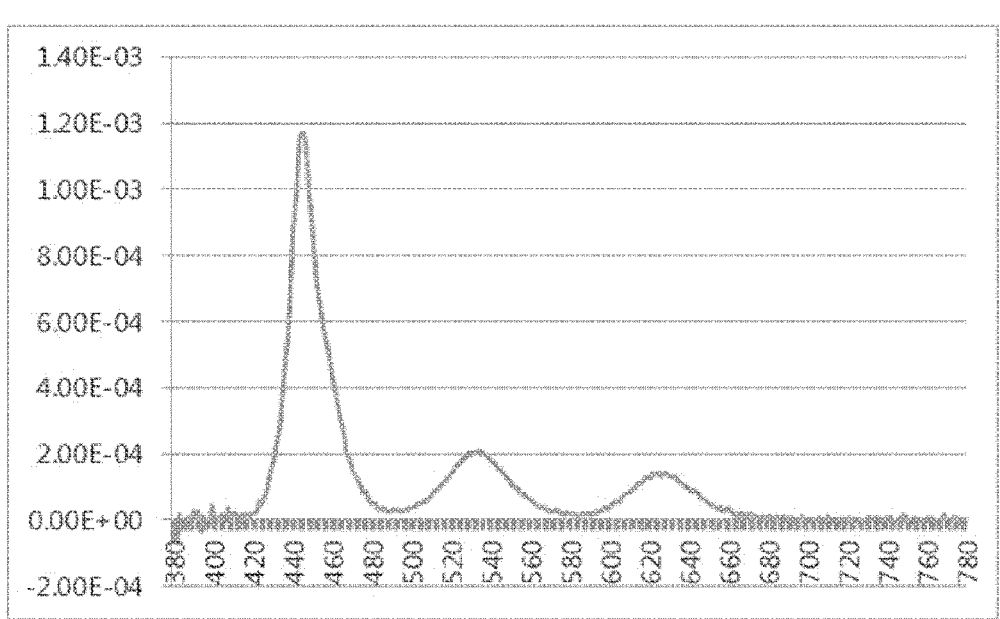
FIG. 1 is a graph of the spectrum of an LED element packaged by containing quantum dots coated with a polymer in Example 1.

Hereinafter, the present disclosure will be described in detail.

All terms (including technical and scientific terms) used herein will be used with the same meaning as commonly understood by a person skilled in the art to which the present disclosure pertains. Terms that are commonly used and defined in dictionaries will not be interpreted in an idealized or overly formal sense unless expressly so defined herein.

Throughout the specification, when a part "includes" or "contains" an element, it may indicate that the part does not exclude another element but can further include another element, unless otherwise stated. Throughout the specification, "above" or "on" means not only the case where it is located above or below a target part but also the case where there is another part in the middle thereof and does not necessarily mean the upward direction of gravity.

<Quantum Dot-Polymer Composite Particles>

Quantum dot-polymer composite particles according to an embodiment of the present disclosure include: a quantum dot (QD); and a (meth)acrylic polymer coating layer formed to enclose the quantum dot.

The (meth)acrylic polymer coating layer may be formed using an acrylic or methacrylic polymer known in the art without limitation. Specifically, a (meth)acrylic polymer containing a polar functional group in a predetermined range in a molecule thereof is preferably used. Such a functional group may react with some chemical materials, and the use of this reaction induces polymer coating on the surface of a quantum dot. Examples of the chemical materials used are compounds containing Zn, Al, Ti, and/or Zr.

According to an embodiment of the present disclosure, the (meth)acrylic polymer coating layer may contain a polymer of (meth)acrylic monomers or a (meth)acrylic resin, in which the content of at least one polar functional group selected from a carboxyl group and a hydroxy group is 1 wt % or more, and specifically 1-50 wt %, in a molecule and which has a weight average molecular weight (Mw) of 5,000 g/mol or more, and specifically 10,000-500,000 g/mol.

The (meth)acrylic polymer coating layer may be formed on a part or all of the surface of the quantum dot, and specifically may be formed on a halide surface treatment layer, which is to be described later, bound to the surface of the quantum dot. The thickness of the (meth)acrylic polymer coating layer is not particularly limited and may be several nanometers (nm) to several tens of micrometers (μm), and for example, 1 nm to 20 μm. The (meth)acrylic polymer coating layer, when having a thickness of specifically 10 nm to several tens of μm, and more specifically 100 nm to 20 μm, can result in excellent luminous efficiency and stability of properties.

A target on which the aforementioned halide surface treatment layer is to be formed is not particularly limited as long as it is in the form of a particle including a quantum dot, and examples thereof may be a conventional quantum dot (QD) nanoparticle, a quantum dot-containing particle, or a primary particle of a plurality of quantum dots aggregated.

The quantum dot (QD) may be called a nano-sized semiconductor material. Atoms constitute molecules, and the molecules constitute an aggregate of small molecules, called a cluster, thereby forming a nanoparticle. When such nanoparticles exhibit semiconductor properties, they are called quantum dots. When the quantum dots arrive at an exited state by receiving energy from the outside, the quantum dots emit energy according to their own corresponding energy bandgaps.

Such a quantum dot may have a homogeneous single-layer structure; a multi-layer structure, such as a core-shell type or a gradient structure; or a mixed structure thereof.

According to an embodiment, the quantum dot (QD) may have a core-shell structure including at least one shell layer.

The at least one shell layer may contain zinc (Zn) and sulfur (S), and specifically, the outermost surface of the quantum dot may contain zinc (Zn) and sulfur (S).

However, the quantum dot is not particularly limited thereto. Non-limiting examples of the shell ingredients may be ZnS, ZnSeS, ZnTeS, ZnSeTeS, CdZnS, CdZnSeS, CdZnTeS, HgZnS, HgZnSeS, HgZnTeS, and the like. The aforementioned ingredients may be used alone or in a mixture of two or more thereof.

The ingredients of a core, and/or a plurality of shell layers excluding the surface (outermost), which constitute the quantum dot (QD), may be each independently and freely selected from a group II-VI compound, a group III-V compound, a group IV-VI compound, a group IV element, a group IV compound, and a combination thereof. In a case of a plurality of shell layers, the respective layers may contain different ingredients, for example, (semi)metal oxides, and may be freely configured from the ingredients exemplified below.

For example, the group II-VI compound may be selected from the group consisting of: binary compounds selected from the group consisting of CdO, CdS, CdSe, CdTe, ZnO, ZnS, ZnSe, ZnTe, HgS, HgSe, HgTe, MgSe, MgS, and a mixture thereof; ternary compounds selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and quaternary compounds selected from the group consisting of CdZnSeS, CdZnSeTe, CdZnSTe, CdHgSeS, CdHgSeTe, CdHgSTe, HgZnSeS, HgZnSeTe, HgZnSTe, and a mixture thereof.

As another example, the group III-V compound may be selected from the group consisting of: binary compounds selected from the group consisting of GaN, GaP, GaAs, GaSb, AlN, AlP, AlAs, AlSb, InN, InP, InAs, InSb, and a mixture thereof; ternary compounds selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and quaternary compounds selected from the group consisting of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof.

As another example, the group IV-VI compound may be selected from the group consisting of: binary compounds selected from the group consisting of SnS, SnSe, SnTe, PbS, PbSe, PbTe, and a mixture thereof; ternary compounds selected from the group consisting of SnSeS, SnSeTe, SnSTe, PbSeS, PbSeTe, PbSTe, SnPbS, SnPbSe, SnPbTe, and a mixture thereof; and quaternary compounds selected from the group consisting of SnPbSSe, SnPbSeTe, SnPbSTe, and a mixture thereof.

As another example, the group IV element may be selected from the group consisting of Si, Ge, and a mixture thereof. The group IV compound may be a binary compound selected from the group consisting of SiC, SiGe, and a mixture thereof.

The aforementioned binary compounds, ternary compounds, or quaternary compounds may be present in a uniform concentration in a particle, or may be present in a state in which the concentration is partially unequally distributed, in the same particle. Alternatively, the compounds may have a core-shell structure in which one quantum dot encloses another quantum dot. The interface between the core and the shell may have a concentration gradient in which the concentration of an element present in the shell decreases toward the center.

The form of quantum dots is not particularly limited as long as it has a form that is generally used in the art. For example, sphere-shaped, rod-shaped, pyramidal, disk-shaped, multi-arm, or cubic nanoparticles, nanotubes, nanowires, nanofibers, nanoplatelet particles, and the like may be used.

The size of the quantum dots is not particularly limited, and may be appropriately adjusted within a conventional range that is known in the art. For example, the average particle diameter ($D_{50}$) of the quantum dots may be 1 to 20 nm, and specifically 2 to 15 nm. When the particle size of the quantum dots is controlled to a range of approximately 1 to 20 nm as described above, the quantum dots can exhibit light of a desired color. For example, blue light emitting quantum dots (QDs) may be used in the present disclosure. In a specific embodiment, Cd-based group II-VI QDs (e.g., CdZnS, CdZnSSe, CdZnSe, CdS, or CdSe), non-Cd-based group II-VI QDs (e.g., ZnSe, ZnTe, ZnS, or HgS), or non-Cd-based group III-V QDs (e.g., InP, InGaP, InZnP, GaN, GaAs, or GaP) may be used as blue light emitting quantum dots (QDs).

In another embodiment, the quantum dot-containing particle is a particle containing at least one quantum dot, and specifically is in a form that includes at least one quantum dot particle bound to the surface of an inorganic core particle or a polymer core particle.

In still another embodiment, the primary particle may be a particle in which a plurality of quantum dots are aggregated, or a particle in which a plurality of quantum dots are embedded in a matrix. Such a matrix may be a conventional inorganic or organic material known in the art.

The primary particle may further contain conventional thermally conductive inorganic particles known in the art. These inorganic particles serve to emit the self-heating of quantum dots to the outside due to excellent thermal conductivity thereof.

Non-limiting examples of the thermally conductive inorganic particles that can be used are aluminum oxide, silicon oxide, titanium dioxide, aluminum nitride, boron nitride, silicon nitride, silicon carbide, aluminum oxide, or a mixture of two or more thereof.

The average particle diameter ($D_{50}$) of the thermally conductive inorganic particles is not particularly limited, and may be appropriately adjusted within a conventional range that is known in the art. For example, the average particle diameter of the thermally conductive inorganic particles may be 1 to 100 μm, and specifically 1 to 50 μm.

Two or more types of thermally conductive inorganic particles having different average particle diameters or different ingredients may be used in a mixture thereof.

The content of these thermally conductive inorganic particles is not particularly limited, and may be appropriately adjusted considering exothermic characteristics. For example, the content of the thermally conductive inorganic particles may be 0.1 to 99.9 parts by weight, and specifically 0.5 to 99.5 parts by weight, relative to the total weight (e.g., 100 parts by weight) of the primary particle. Alternatively, the thermally conductive inorganic particles may be 1 to 100,000 parts by weight, and specifically 100 to 100,000 parts by weight, relative to 100 parts by weight of quantum dots to be mixed therewith.

The quantum dot-polymer composite particle according to an embodiment of the present disclosure may include a surface treatment layer containing at least one of a halide and an oxyhalide between a quantum dot and a polymer coating layer. As a specific example, a quantum dot; an (oxy)halide surface treatment layer bonded to the surface of the quantum dot; and the (meth)acrylic polymer coating layer may be sequentially formed.

The surface treatment layer may contain, without limitation, a halogen (X=F, Cl, Br, or I)-containing material known in the art, for example, at least one halogen salt among a fluoride, a chloride, a bromide, and an iodide. Specifically, the surface treatment layer may contain an organic halide, an inorganic halide, an inorganic oxyhalide, or a combination thereof.

Non-limiting examples of the halogen-containing material that can be used may be tetrabutyl ammonium bromide, cetyl trimethyl ammonium bromide, cetyl ammonium bromide (CTAB), ammonium chloride, ammonium bromide, ammonium iodide, ammonium fluoride, potassium chloride, potassium bromide, potassium iodide, sodium chloride, sodium bromide, sodium iodide, indium chloride, indium bromide, indium iodide, and the like. The aforementioned ingredients may be used alone or in a mixture of two or more thereof.

In a specific embodiment, the halides or oxyhalides may be represented by Chemical Formula 1 below:

$$MO_aX_b \qquad \text{[Chemical Formula 1]}$$

wherein,

M is a metal selected from the group consisting of groups I, 2, and 3, and transition metals;

X is a halogen selected from F, Cl, Br, and I;

a is an integer of 0 to 2; and b is an integer of 1 to 3.

As a preferred example of Chemical Formula 1 above, the metal (M) may be at least one selected from the group consisting of Li, Na, K, Rb, Cs, Be, Mg, Ca, Sr, Ba, Al, Zn, Zr, and Zn, and more specifically at least one selected from the group consisting of Al, Zn, and Zr.

The inorganic halide refers to a conventional compound in which at least one metal and at least one halogen atom are ionically bonded. Specific examples of such an inorganic halide containing a metal (M) are zinc (Zn)-based halides, such as $ZnCl_2$, $ZnBr_2$, and $ZnI_2$, aluminum (Al)-based halides, such as $AlCl_3$, and the like. However, the inorganic halide is not particularly limited thereto.

In addition, the inorganic oxyhalide (oxyhalide or oxo-halide) refers to a compound in which an oxygen atom and a halogen atom are each bonded to a metal (M) in a single molecule. Specific examples of such a metal oxyhalide may be zirconium (Zr)-based oxyhalides, such as $ZrOCl_2$. The aforementioned ingredients may be used alone or in a mixture of two or more thereof.

In the (oxy)halide surface treatment layer according to the present disclosure, a part or all of the organic material (e. g., an organic ligand) present on the surface of the quantum dot is removed through surface treatment in a solution, and a cationic material (e.g., M) and a halide anion material (e.g., X), which constitute the surface treatment layer, are replaced by binding with a part or all of the surface of the quantum dot. As the organic ligand layer is removed, the binding occurs on the surface of the quantum dot, and the cationic material and halide anion material resulting from the (oxy) halide-containing material can inhibit additional binding on the surface of the quantum dot. In addition, the organic ligand material present on the surface of the quantum dot can be in advance prevented from acting as a restriction factor in various applications of quantum dots, so that the applications of quantum dots can be smoothly and diversely extended.

Especially, most of the conventional sealants for LED PKG employs a platinum (Pt) catalyst, and such a Pt catalyst reacts with sulfur (S) on the surface of quantum dots and thus does not act as a catalyst, failing to complete curing of the sealants. Moreover, the organic ligand material bound to the surface of the quantum dots prevents curing of the sealants. In contrast, the (oxy)halide adopted as a surface treatment agent in the present disclosure makes a detach-ment of the organic material (e.g., oleate) bound to the surface (e.g., Zn) of the quantum dot and thus allows a halogen element to be bound thereto, and furthermore, a cation component (e.g., Zn) of the (oxy)halide is bound with an anion element (e.g., sulfur) present on the surface of the quantum dot. As such, the anion element (e.g., sulfur (S)) and the cation (M) element (e.g., zinc (Zn)) present on the surface of the quantum dots are doubly and stably attached to the metal component (e.g., Zn) and halogen of the (oxy)halide, respectively, so that the aforementioned prob-lems are resolved and thus quantum dots (QDs) can be directly applied to LED PKG.

The thickness of the (oxy) halide surface treatment layer is not particularly limited, and may be, for example, 0.1 to several nm, and specifically 0.1 to 1 nm. In addition, the content of the (oxy)halide is not particularly limited, and may be appropriately adjusted considering the above-de-scribed replacement effect and stability on the surface of the quantum dot. For example, the content of the (oxy)halide may be 0.0001 to 10 parts by weight, and specifically 0.001 to 5 parts by weight, relative to 100 parts by weight of the corresponding quantum dot-polymer composite particles.

<Manufacturing Method for Quantum Dot-Polymer Com-posite Particles>

Hereinafter, a manufacturing method for quantum dot-polymer composite particles according to an embodiment of the present disclosure will be described. However, the method of the present disclosure is not limited to only the following manufacturing method and respective steps there-for may be modified or selectively mixed as needed.

In the present disclosure, the surface of the quantum dots is coated with a (meth)acrylic polymer, and more specifi-cally, a quantum dot (QD) having an organic ligand or a capping layer bound to the surface thereof is subjected to replacement with an (oxy)halide-containing material in a solution, and then a (meth)acrylic polymer coating layer is formed on the (oxy)halide surface treatment layer.

A preferable embodiment of the manufacturing method may include: (i) preparing a polymer-containing solution in which a polymer is dissolved ("Step S10"); (ii) adding and mixing quantum dots with the polymer-containing solution, and then curing the mixture by addition of a polymer curing inducer ("Step S20"); and (iii) separating a cured product from the polymer-containing solution and then drying the cured product (Step S30").

Hereinafter, the manufacturing method will be described by steps.

(1) Step of Preparing Polymer Coating Solution ("Step S10")

In Step S10, a polymer-containing solution is prepared as a surface coating agent for quantum dots.

As the polymer, conventional acrylic or methacrylic poly-mers known in the art may be used without limitation, and specifically, a (meth)acrylic polymer containing a polar functional group in a predetermined range in a molecule is preferably used.

According to an embodiment of the present disclosure, a polymer of (meth)acrylic monomers or a (meth)acrylic resin, in which the content of at least one polar functional group selected from a carboxyl group and a hydroxy group is 1 wt % or more, and specifically 1-50 wt %, in a molecule thereof and which has a weight average molecular weight (Mw) of 5,000 or more, and specifically 10,000-500,000 g/mol, may be used as the (meth)acrylic polymer.

As a solvent, a conventional organic solvent known in the art capable of dissolving the (meth)acrylic polymer therein may be used without limitation. Examples of the organic solvent are aromatic hydrocarbon-based solvents, ester-based solvent, ether-based solvents, or a mixture thereof.

The concentration of the polymer-containing solution is not particularly limited, and can be appropriately adjusted within a typical content range in which a uniform polymer coating layer can be formed on the quantum dots.

2) Quantum Dot Coating Step (Step "S20")

In Step S20, quantum dots are added in the polymer-containing solution prepared in the previous step, followed by curing, thereby preparing quantum dots coated with the polymer ("Step S20").

As a quantum dot (QD), a conventional one that is known in the art may be used without limitation, and examples thereof may be a quantum dot (QD) nanoparticle, a quantum dot-containing particle, or a primary particle of a plurality of quantum dots aggregated. In a specific embodiment, the quantum dot may have a core-shell structure including at least one shell layer, and the at least one shell layer may contain zinc (Zn) and sulfur (S).

The use amount of quantum dots added to the polymer-containing solution is not particularly limited, and may be appropriately adjusted within a range that is known in the art.

Meanwhile, the (meth)acrylic polymer contains a polar functional group, for example, a carboxyl group or a hydroxyl group, in a predetermined content range in a molecule. These functional groups can react with some chemical materials, such as a polymer curing inducer, and these reactions are used to induce the uniform formation of a polymer coating on the surface of the quantum dot. Therefore, a polymer curing inducer may be added to the polymer-containing solution in which the quantum dots are added in Step S20.

A specific example of the polymer curing inducer that can be used may be at least one of a Zn-based compound, an Al-based compound, a Ti-based compound, and a Zr-based compound.

The Zn-based compound is a zinc (Zn) metal itself or a compound containing zinc (Zn), and is not particularly limited as long as the compound is commonly known in the art. Examples of the Zn-based compound are zinc acetate, dimethyl zinc, diethyl zinc, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, and the like, but are not limited thereto. These may be used alone or in a mixture of two or more thereof.

According to an embodiment, the zinc precursor may be zinc acetate.

The Al-based compound is also a zinc (Zn) metal itself or a compound containing zinc (Zn), and is not particularly limited as long as the compound is commonly known in the art. Examples thereof may be: aluminum salt compounds, such as aluminum octylate, aluminum triacetate, and aluminum tristearate; aluminum alkoxide compounds, such as aluminum trimethoxide, aluminum triethoxide, aluminum triallyl oxide, and aluminum triphenoxide; and aluminum chelate compounds, such as aluminum methoxybis(ethylacetoacetate), aluminum methoxybis(acetylacetonate), aluminum ethoxybis(ethylacetoacetate), aluminum ethoxybis(acetylacetonate), aluminum isopropoxybis(ethylacetoacetate), aluminum isopropoxybis(methylacetoacetate), aluminum isopropoxybis(t-butylacetoacetate), aluminum butoxybis (ethylacetoacetate), aluminum dimethoxy (ethylacetoacetate), aluminum dimethoxy (acetylacetonate), aluminum diethoxy (ethylacetoacetate), aluminum diethoxy (acetylacetonate), aluminum diisopropoxy (ethylacetoacetate), aluminum diisopropoxy (methylacetoacetate), aluminum tris(ethyl acetoacetate), aluminum tris(acetylacetonate), and aluminum octyl acetoacetate diisoproplate, and these may be mixed alone or in a mixture of two or more thereof.

The use amount of the polymer curing inducer contained in the polymer-containing solution is not particularly limited, and may be, for example, 2 to 30 parts by weight relative to the total weight of the polymer-containing solution. In addition, when a Zn-based compound is used as a polymer curing inducer, the Zn-based compound is preferably mixed with an alcoholic solvent. The ratio of the Zn-based polymer curing inducer and the alcoholic solvent that are used may be 1-100 parts by weight, and specifically 5-30 parts by weight, but is not particularly limited thereto.

In Step S20, curing conditions are not particularly limited, and may be appropriately adjusted within a range that is known in the art. For example, thermal curing may be performed at a temperature of 150 to 180° C. for 1-3 hours.

In the present disclosure, quantum dots in which an (oxy)halide surface treatment layer has already been formed may be used as needed. The quantum dots with the (oxy)halide surface treatment layer formed thereon may be manufactured by the manufacturing method exemplified below, but is not limited thereto, and each step may be modified.

An example of the method for manufacturing quantum dots with the (oxy)halide surface treatment layer formed thereon may include: (a) mixing quantum dots, a solvent, and a non-solvent, followed by separation, thereby preparing a first solution in which quantum dots are dispersed ("Step S1"); (b) preparing a second solution in which at least one compound of halide and oxyhalide materials is dissolved ("Step S2"); and (c) mixing and stirring the first solution and the second solution, followed by precipitation, thereby obtaining quantum dots with an (oxy)halide surface treatment layer formed thereon and an organic ligand removed therefrom ("Step S3").

In Step S1, the quantum dots are separated using the characteristics of the immiscible solvent and non-solvent, and then the separated quantum dots are re-dispersed in a non-polar solvent to prepare a first solution.

The contents of the quantum dots, solvent, and non-solvent are not particularly limited, and for example, the ratio of the solvent and non-solvent used may be a volume ratio of 100:20-80, and specifically 100:30-60.

Non-limiting examples of the solvent that can be used are hexane, benzene, xylene, toluene, octane, chloroform, chlorobenzene, tetrahydrofuran (THF), methylene chloride, 1,4-dioxane, diethyl ether, cyclohexane, dichlorobenzene, and the like, and these may be used alone or in a mixture of two or more thereof. Non-limiting examples of the non-solvent that can be used are acetone, ethanol, methanol, butanol, propanol, isopropyl alcohol, tetrahydrofuran, dimethyl sulfoxide, dimethylformamide, and the like, and these may be used alone or in a mixture of two or more thereof.

The quantum dots separated using the characteristics of the solvent and non-solvent are dispersed in a non-solvent to prepare a first solution. Examples of the non-polar solvent that can be used are hexane, benzene, xylene, toluene, octane, chloroform, chlorobenzene, tetrahydrofuran (THF), methylene chloride, 1,4-dioxane, diethyl ether, cyclohexane, dichlorobenzene, and the like, but are not limited thereto.

As needed, thermally conductive inorganic particles may be added and dispersed in the first solution. The amount of the thermally conductive inorganic particles used is not particularly limited, and may be, for example, 100 to 1,000, 000 parts by weight relative to the total weight (e.g., 100 parts by weight) of the quantum dots.

Thereafter, in Step S2, an (oxy)halide-containing solution ("second solution") as a surface treatment agent for the quantum dots is prepared.

The halide and/or oxyhalide compound may be a conventional organic halide, inorganic halide, or inorganic oxyhalide, or a mixture thereof, which is known in the art. Non-limiting examples of the halogen-containing material that can be used are tetrabutyl ammonium bromide, cetyl trimethyl ammonium bromide, cetyl ammonium bromide (CTAB), ammonium chloride, ammonium bromide, ammonium iodide, ammonium fluoride, potassium chloride, potassium bromide, potassium iodide, sodium chloride, sodium bromide, sodium iodide, indium chloride, indium bromide, indium Iodide, and the like. The aforementioned ingredients may be used alone or in a mixture of two or more thereof. An inorganic halide or inorganic oxyhalide represented by Chemical Formula 1 as described above may also be used.

As the solvent, a polar solvent, a non-polar solvent, or both thereof, which are known in the art and can dissolve the halide compound therein, may be used.

The concentration of the second solution prepared as described above is not particularly limited, and for example, the (oxy)halide compound may be adjusted to contain 1 to 30 parts by weight, and specifically 5 to 20 parts by weight, relative to the total weight of the second solution.

Then, the prepared first and second solutions are mixed and stirred at a predetermined ratio to form quantum dots (QDs) surface-treated with an (oxy)halide, and precipitation is induced.

Considering the extent of replacement of the (oxy)halide, the mixing ratio of the first solution and the second solution may be adjusted to a volume ratio of 95-60:5-40, and specifically 93-80:7-20.

Thereafter, the quantum dots surface-treated with an (oxy)halide are separated using the characteristics of the solvent and the non-solvent and then are induced to precipitate. The separation method of such quantum dots is not particularly limited as long as the method is known as a liquid-solid separation method in the art, and may be for example, a centrifugation method or the like. The quantum dots surface-treated with an (oxy)halide may be stored by re-dispersion in a non-polar solvent, or the surface-treated quantum dots may be stored by drying and removing the abovementioned non-polar solvent.

(3) Step of Obtaining Quantum Dot-Polymer Composite Particles with Polymer Coating ("Step S30")

In Step S30, the quantum dots coated with the polymer, which are a resultant product of the curing reaction, are separated from the polymer solution and then dried.

The quantum dots coated with the polymer may be pulverized as needed. The size of pulverization is not particularly limited, and may be adjusted to a size that can facilitate packaging (PKG). For example, the pulverization may be performed to an average particle diameter (d50) of 100 μm or less, and specifically 5 to 70 μm.

The quantum dot-polymer composite particles of the present disclosure manufactured as above can be applied to a conventional light emitting element display known in the art. Examples of the light emitting element display may be a light emitting diode (LED) display, an organic light emitting diode (OLED) display, or the like.

The quantum dot-polymer composite particles of the present disclosure solve a conventional problem of non-curing of a heat-curable resin due to quantum dots by including a polymer coating layer formed on the surface thereof, and thus can be directly applied to LED packaging (PKG) and extensively applied to various technical fields. Additionally, the quantum dot-polymer composite particles can be variously applied to all kinds of electronic elements requiring quantum dots (QD), such as various displays, sensors, imaging sensors, and solar cells.

Hereinafter, the present disclosure will be described in detail with reference to examples. However, the following examples are merely for illustrating the present disclosure and are not intended to limit the scope of the present disclosure.

Example 1

1-1. Quantum Dot Surface Treatment

Quantum dots (InP/ZnSeS) of 10 nm or less manufactured in a core-shell form were separated using 100 ml of ethanol and 50 ml of acetone, and the separated quantum dots were dispersed in 10 ml of toluene to prepare a first solution. A halide compound ($NH_4Cl/ZnCl_2$) as a surface treatment agent was dissolved to 5 parts by weight in ethanol to prepare a halide-containing solution (second solution). The second solution containing the halide and the first solution in which the quantum dots were dispersed were mixed such that the mixing ratio therebetween was a volume ratio of 15:85, followed by vigorous stirring. The sufficiently stirred mixed solution was centrifuged using a solvent and a non-solvent, and then the precipitation of quantum dots (QDs) was induced. The precipitated quantum dots (QDs) were dispersed in toluene. Some of the precipitated quantum dots were dried and used as a material for measuring a recovery rate after heat treatment.

1-2. Polymer Coating

The quantum dots manufactured in Example 1-1 were added in a content of 10 parts by weight to 100 ml of a solution in which an acrylic polymer was dissolved, followed by vigorous stirring. After the complete mixing of the quantum dots, 25 parts by weight of a polymer curing inducer (zinc acetate) was added to the solution, and the acrylic polymer was cured, followed by centrifugation, thereby separating the polymer from the solution. The separated quantum dots coated with the acrylic polymer were dried, and then pulverized to be adjusted to a size of 100 μm or less that can be well packaged (PKG).

Example 2

2-1. Quantum Dot Surface Treatment

As shown in Example 1, 10 parts by weight of BN and $Al_2O_3$ as thermally conductive inorganic particles were added and mixed with a solution of a core-shell form of quantum dots separated using solvent-non-solvent, followed by vigorous stirring. A halide compound ($ZnI_2$) as a surface treatment agent was dissolved to 5 parts by weight in ethanol to prepare a second solution. The second solution containing the halide and the first solution in which the quantum dots and the thermally conductive inorganic particles were dispersed were mixed such that the mixing ratio therebetween was a weight ratio of 15:85, and then a solvent and a non-solvent are used to induce precipitation such that both the thermally conductive inorganic particles and the quantum dots (QDs) can be precipitated. The precipitated quantum dots (QDs) and thermally conductive inorganic particles were dispersed in toluene. Some of the precipitated quantum dots were dried and used as a material for measuring a recovery rate after heat treatment.

2-2. Polymer Coating

The quantum dots and thermally conductive inorganic particles manufactured in Example 2-1 were added to a solution in which an acrylic polymer was dissolved, followed by vigorous stirring. After the quantum dots were completely mixed, 20 parts by weight of a polymer curing inducer ($AlCl_3$) was added to the solution to cure the acrylic polymer, followed by centrifugation, thereby separating the polymer from the solution. The separated quantum dots coated with the acrylic polymer were dried, and then pulverized to be adjusted to a size of 100 μm or less that can perform favorable PKG.

Comparative Example 1

Surface-untreated core-shell form of quantum dots were separated using a solvent and a non-solvent, and the separated quantum dots were dispersed in 10 parts by weight of toluene.

Experimental Example 1: Evaluation of Curing Degree of Silicone Resin

The curing degree of a silicone resin by quantum dots was evaluated as follows.

Specifically, the curing degree of a silicone resin was measured by mixing quantum dots and the silicone resin as shown in the compositions shown in Table 1 below, and then the mixtures were cured at 150° C. for 2 hours. Quantum dots that were not subjected to surface treatment and polymer coating were used as a control.

The un-cured mentioned herein means that the degree of curing is 50% or less, showing that a resin flows down in a liquid-like form, and the pre-cured mentioned herein means that the degree of curing is 50-80%, showing that a resin has a sticky surface and is separated upon the contact with another object. The cured mentioned herein means that the degree of curing is 95-100%, showing the same level as the curing form of a general resin.

As an experimental result, the use of only a silicone resin without quantum dots results in a complete cured state of the silicone resin, but Comparative Example 1 in which a silicone resin was mixed with quantum dots not subjected to surface treatment and polymer coating showed an un-cured state of the silicone resin. It could be seen that the quantum dots acted as a factor to hinder the curing of the heat-curable silicone resin.

However, Example 1 using quantum dots that were surface treated and had a polymer coating layer showed complete curing of the silicone resin, showing that the silicone resin was completely cured even when exothermic inorganic particles were mixed with the surface-treated quantum dots (see Table 1).

TABLE 1

| Composition | | |
| --- | --- | --- |
| Quantum dots | Silicone resin | Degree of curing |
| — | 100 | Cured |
| Surface-treated quantum dots in Example 1-1 | 10 | Pre-cured |
| Mixture of surface-treated quantum dots and thermally conductive inorganic material in Example 2-1 | 30 | Cured |
| Polymer-coated quantum dots in Example 1 | 30 | Cured |
| Surface-untreated quantum dots in Comparative Example 1 | 10 | Un-cured |

Experimental Example 2: Evaluation of Recovery Rate after Heat Treatment

The quantum dots (QDs) manufactured in the present disclosure were evaluated for the recovery rate after heat treatment by using Otsuka QE-2100 equipment while the QE value was measured with the temperature raised and the QE value was again measured with the temperature lowering to room temperature.

The recovery rate was based on the LED luminous efficiency (e.g., 100%) before heat treatment (RT). After these were subjected to heat treatment at specific temperatures, the luminous efficiency of LED was measured at each of the temperatures. The untreated quantum dots of Comparative Example 1 were used as a control.

The experimental results verified that Example 1 containing the surface-treated and polymer-coated quantum dots showed a superior recovery rate according to the heat treatment temperature compared with Comparative Example 1 containing untreated quantum dots (see Table 2 below).

TABLE 2

| | Sample | | | | |
| --- | --- | --- | --- | --- | --- |
| | Heat treatment temperature and recovery rate (%) | | | | |
| Quantum dots | RT (before heat treatment) | 50° C. | 100° C. | 150° C. | RT (after heat treatment) |
| Surface-untreated quantum dots (Comparative Example 1) | 100 | 93 | 83 | 70 | 75 |
| Surface-treated quantum dots (Example 1-1) | 100 | 88 | 67 | 59 | 77 |
| Surface-treated quantum dots + BN | 100 | 92 | 84 | 67 | 80 |
| Surface-treated quantum dots + BN + Al$_2$O$_3$ (Example 2-1) | 100 | 98 | 88 | 67 | 98 |
| Polymer-coated quantum dots (Example 1) | 100 | 98 | 90 | 75 | 102 |

Experimental Example 3: Evaluation of Performance and Stability of LED Package LED PKG was manufactured by using the quantum dots coated with a polymer in Example 1 as in Experimental Example 1.

Specifically, as shown in Table 1 above, quantum dots were mixed with a silicone resin (Dow corning) to prepare a curable resin composition, which was then applied on the LED PKG after the removal of the solvent in a vacuum condition, followed by heat curing at 150° C. for 2 hours, thereby completing LED packaging. Thereafter, the LED PKG was evaluated for the luminous intensity over time by being driven at a current of 190 mA, and these results are shown in FIGS. 1 and 2.

Figure 2:
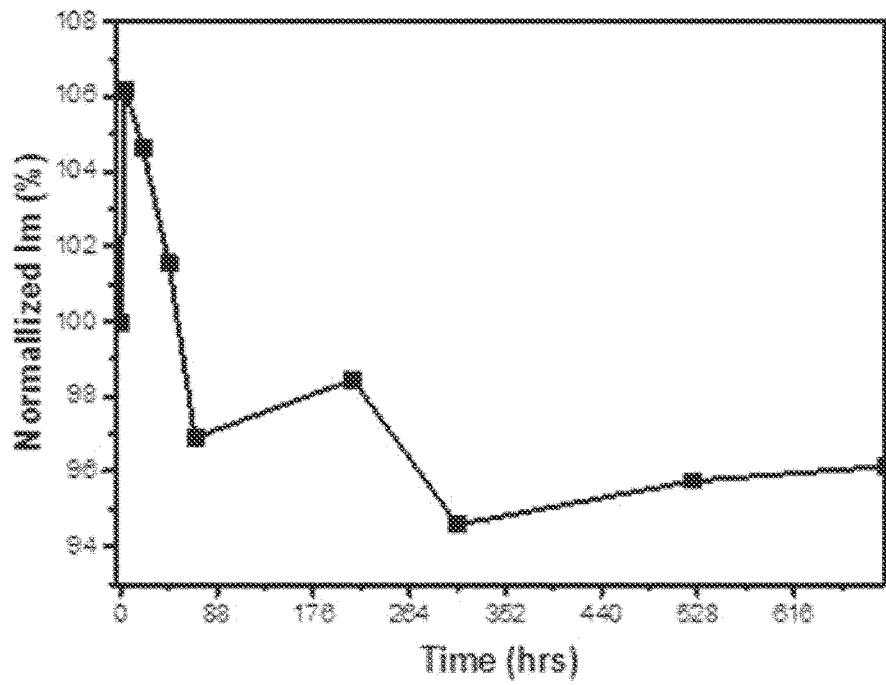
FIG. 2 is a graph of the stability change over time in an LED element packaged by containing quantum dots coated with a polymer in Example 1.

It can be seen from the experimental results that the LED of the present disclosure packaged by containing quantum dots coated with a polymer, even though quantum dots were directly LED packaging, could not only exhibit excellent luminous efficiency and various wavelengths but also secure stability over time (see FIGS. 1 and 2).

Meanwhile, the quantum dots of Comparative Example 1 having the organic ligand bound thereto without a halide surface treatment layer or a polymer coating layer were carbonized within 24 hours, and thus the stability evaluation therefor was impossible.

The invention claimed is:

1. Quantum dot-polymer composite particles, comprising:
a quantum dot (QD); and
a (meth)acrylic polymer coating layer formed to enclose the quantum dot,
wherein the quantum dot-polymer composite particles are obtained by a process comprising:
(i) preparing a polymer-containing solution in which a polymer is dissolved;
(ii) adding and mixing quantum dots with the polymer-containing solution and then curing a resulting mixture by addition of a polymer curing inducer added in an amount of 2 to 30 parts by weight relative to a total weight of the polymer-containing solution prior to curing; and (iii) separating a cured product from the polymer-containing solution and drying the cured product, wherein the quantum dot comprises a surface treatment layer containing an organic halide, an inorganic halide, an inorganic oxyhalide, or a mixture thereof, wherein the polymer curing inducer comprises a Zn-based compound and/or an Al-based compound, and wherein the (meth)acrylic polymer coating layer contains at least one polar functional group selected from a carboxyl group and a hydroxy group in a content of 1-50 wt % in a (meth)acrylic polymer molecule, and wherein the (meth)acrylic polymer coating layer has a molecular weight (MW) of 5,000 to 500,000 g/mol.

2. A method for manufacturing the quantum dot-polymer composite particles of claim 1, the method comprising:

(i) preparing a polymer-containing solution in which a polymer is dissolved;

(ii) adding and mixing quantum dots with the polymer-containing solution and then curing the mixture by addition of a polymer curing inducer; and (iii) separating a cured product from the polymer-containing solution and then drying the cured product, wherein the polymer curing inducer in step (ii) includes at least one of a Zn-based compound and an Al-based compound; and wherein in step (ii), the amount of the polymer curing inducer used is 2 to 30 parts by weight relative to the total weight of the polymer-containing solution, wherein the quantum dot comprises a surface treatment layer containing an organic halide, an inorganic halide, an inorganic oxyhalide, or a mixture thereof, and wherein the polymer curing inducer forms metal-ligand coordinate bonds with the at least one polar functional groups present in the (meth)acrylic polymer, thereby crosslinking and curing the polymer coating layer.

3. The method of claim 2, wherein the quantum dots in step (ii) comprise at least one surface treatment layer of at least one of a halide and an oxyhalide and are obtained by performing steps (a) to (c) below:

(a) mixing quantum dots, a solvent, and a non-solvent, followed by separation, thereby preparing a first solution in which the quantum dots are dispersed;

(b) preparing a second solution in which at least one of a halide and an oxyhalide is dissolved; and (c) mixing and stirring the first solution and the second solution, followed by precipitation, thereby obtaining quantum dots with a surface treatment layer formed thereon and an organic ligand removed therefrom.

4. The method of claim 3, wherein in step (a), 100 to 1,000,000 parts by weight of thermally conductive inorganic particles relative to 100 parts by weight of the quantum dots are added and mixed.

\* \* \* \* \*